(12) United States Patent
Qu et al.

(10) Patent No.: US 11,237,298 B2
(45) Date of Patent: Feb. 1, 2022

(54) ERROR CORRECTION

(71) Applicant: International Business Machines Corporation, Armonk, NY (US)

(72) Inventors: Junmei Qu, Beijing (CN); Lingyun Wang, Beijing (CN); Xi Xia, Beijing (CN); Jin Yan Shao, Beijing (CN); Xin Xin Bai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 16/518,205

(22) Filed: Jul. 22, 2019

(65) Prior Publication Data

US 2021/0026038 A1      Jan. 28, 2021

(51) Int. Cl.
*G01W 1/02* (2006.01)
*G06N 20/00* (2019.01)

(52) U.S. Cl.
CPC ............. *G01W 1/02* (2013.01); *G06N 20/00* (2019.01); *G01W 2203/00* (2013.01)

(58) Field of Classification Search
CPC ..... G01W 1/02; G01W 2203/00; G01W 1/08; Y02A 90/10; G06N 20/00
See application file for complete search history.

(56) References Cited

U.S. PATENT DOCUMENTS

| 2014/0032506 | A1* | 1/2014 | Hoey | G06F 16/215 |
| | | | | 707/691 |
| 2017/0371074 | A1* | 12/2017 | Elkabetz | G01S 13/95 |
| 2020/0097841 | A1* | 3/2020 | Petousis | G06N 5/04 |
| 2020/0264313 | A1* | 8/2020 | Newman | G01S 17/86 |

FOREIGN PATENT DOCUMENTS

| CN | 107729294 A | 2/2018 |
| CN | 108519465 A | 9/2018 |

OTHER PUBLICATIONS

Zhang, Hongliang; "Relationships between meteorological parameters and criteria air pollutants in three megacities in China", 2015, Environmental Research, pp. 249-250 (Year: 2015).*
Zoest et al., "Outlier Detection in Urban Air Quality Sensor Networks," Water Air and Soil Pollution 229(4) • Apr. 2018, 16 pages.

* cited by examiner

*Primary Examiner* — Tarun Sinha
*Assistant Examiner* — Yossef Korang-Beheshti
(74) *Attorney, Agent, or Firm* — Patterson + Sheridan, LLP

(57) ABSTRACT

Correction management techniques are provided. In one embodiment, the techniques involve determining, via a first machine learning model, a first and second data based on a respective first and second raw data obtained from a plurality of sensors, determining, based on a deviation between the first data and the second data, an inaccuracy of the first data, identifying an ambient situation corresponding to the first raw data and the second raw data, selecting, from historical raw data of the plurality of sensors, a group of raw data corresponding to the ambient situation, and correcting, via a second machine learning model, the first data based on the selected group of raw data.

20 Claims, 5 Drawing Sheets

ERROR CORRECTION

BACKGROUND

The present invention generally relates to error correction. Specifically, the present invention relates to computer-implemented methods, computer-implemented systems and computer program products for correcting an error in data monitored by an ambient sensor.

With the development of real-time monitoring and data processing technology, ambient monitoring has become an important aspect of people's daily life. Usually, various types of ambient sensors are deployed for monitoring data. For example, for the purpose of air quality monitoring or weather forecast, a large number of ambient sensors may be deployed across a wide geography area. Various reasons may result in an error in data monitored by the ambient sensor, and thus error detection and correction becomes a research focus.

SUMMARY

In one aspect, a computer-implemented method is disclosed. According to the method, a deviation may be detected by one or more processors between a first data obtained from a sensor in a plurality of sensors and a second data obtained from other sensors in the plurality of sensors, the first data and the second data being obtained in an identical or similar ambient situation. The ambient situation where the first data and the second data are obtained may be identified by one or more processors. A group of raw data that is monitored under the ambient situation may be selected by one or more processors from historical raw data monitored by the plurality of sensors. The first data may be corrected by one or more processors based on the selected group of raw data.

In another aspect, a computer-implemented system is disclosed. The computing system comprises a computer processor coupled to a computer-readable memory unit, where the memory unit comprises instructions that when executed by the computer processor implements the above method.

In another aspect, a computer program product is disclosed. The computer program product comprises a computer readable storage medium having program instructions embodied therewith. The program instructions are executable by an electronic device to cause the electronic device to perform actions of the above method.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present embodiment in the accompanying drawings, the above and other objects, features and advantages of the present embodiment will become more apparent, wherein the same reference generally refers to the same components in the embodiments of the present embodiment.

Throughout the drawings, same or similar reference numerals represent the same or similar elements.

DETAILED DESCRIPTION

Figure 1:
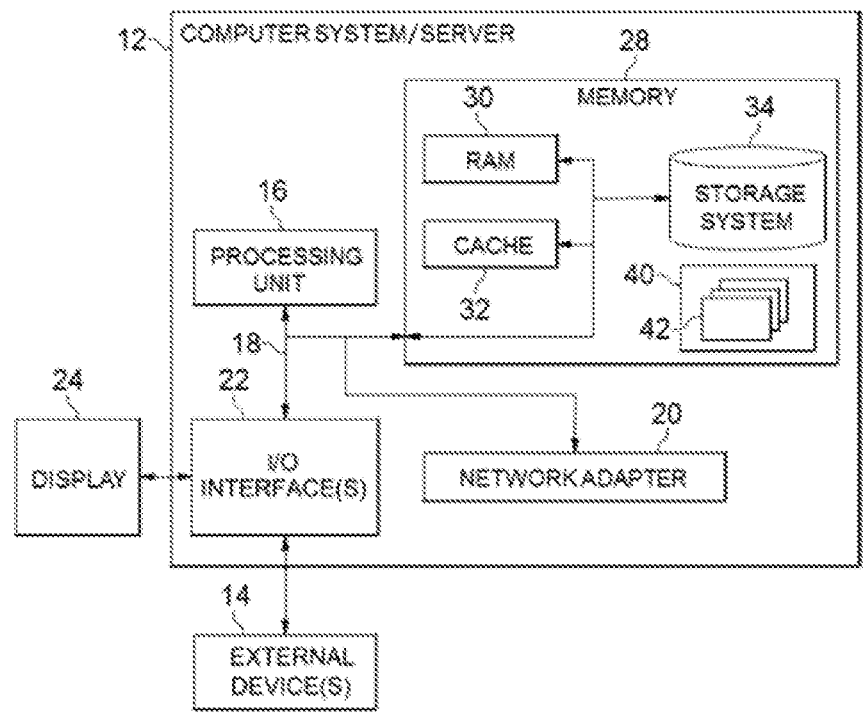
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
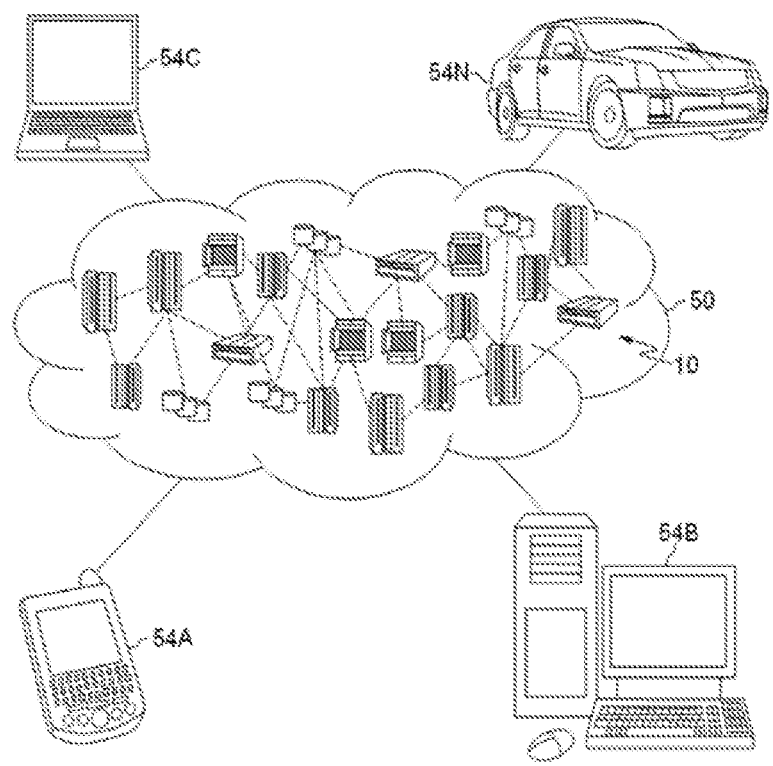
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
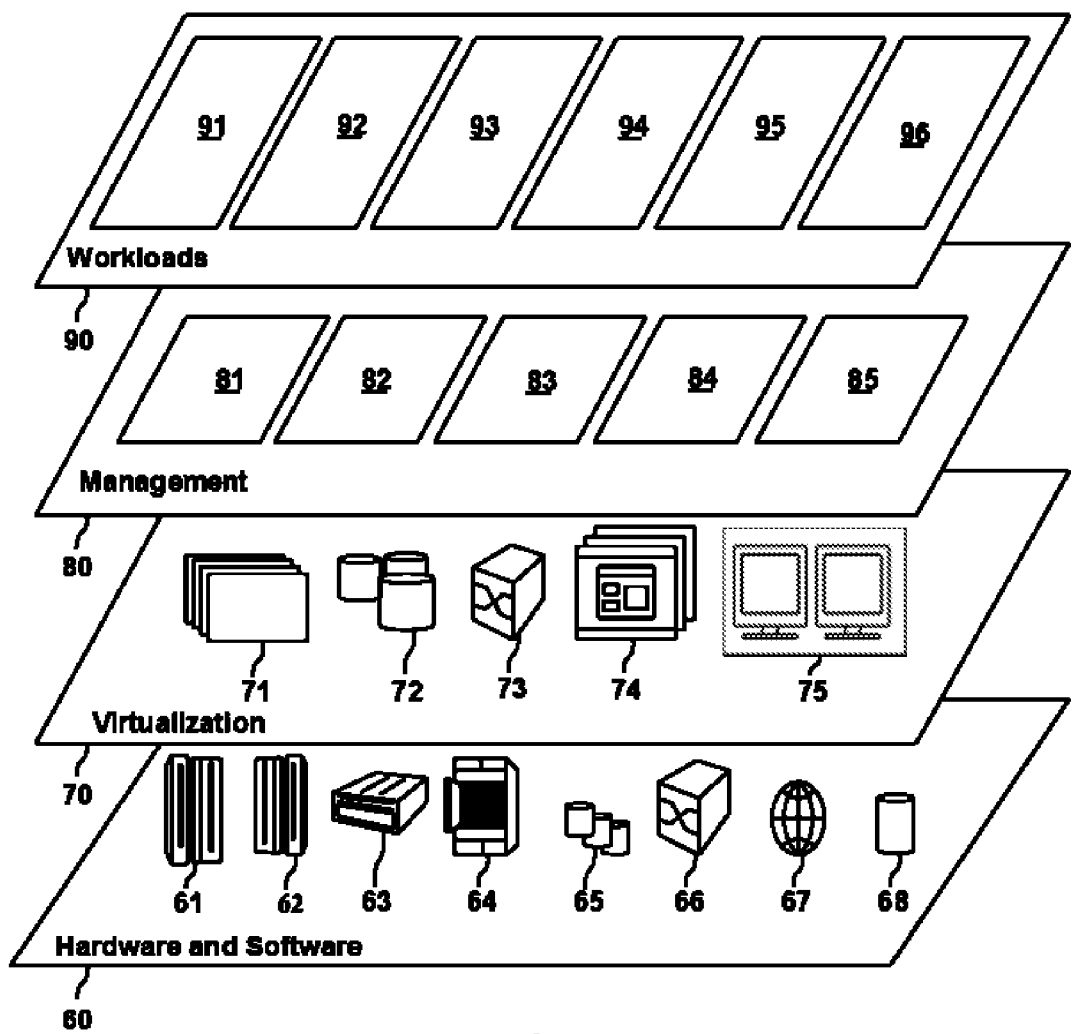
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and correction management 96.

It should be noted that the processing of correction management 96 according to embodiments of this invention could be implemented by computer system/server 12 of FIG. 1. Hereinafter, reference will be made to FIG. 4 to FIG. 8 to describe details of the correction management 96.

Nowadays, various types of ambient sensors are deployed for monitoring data. For example, for the purpose of air quality monitoring, a large number of ambient sensors may be deployed across a wide geography area. In the context of the present invention, the ambient sensor may be an air quality sensor. For example, the ambient sensor may be a PM 2.5 sensor, a PM 10 sensor, a sulfur dioxide sensor, a formaldehyde sensor, and the like. Usually, high precision sensors may be deployed in large scale monitoring stations such as state stations or city stations. While due to great costs for the high precision sensors, cheaper low precision sensors may be deployed in small monitoring points.

Figure 4A:
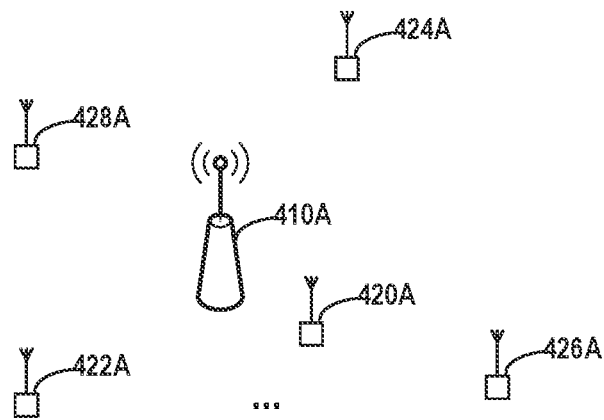
FIG. 4A depicts an example environment in which a plurality of sensors may be deployed according to an embodiment of the present invention.

Reference will be made to FIG. 4A for a general description of the working environment, which figure depicts an example environment in which a plurality of sensors may be deployed according to an embodiment of the present invention. FIG. 4A shows a plurality of sensors that are located in a geography area, where a sensor 410A indicates a high precision sensor and sensors 420A, 422A, 424A, 426A and 428A indicate low precision sensors. As the low precision sensors usually cannot monitor the ambient parameters with high precision, raw data monitored by the low precision sensors should be corrected by raw data monitored by a nearby high precision sensor. As shown in FIG. 4A, raw data monitored by the sensors 420A, 422A, 424A, 426A and 428A should be corrected based on a correction model.

Usually, the correction model may be generated for correcting the raw data monitored by the low precision sensors 420A, 422A, 424A, 426A and 428A. Reference will be made to the sensor 420A to describe a general procedure for the correction. Supposing the raw data monitored by the sensor 420A is represented by "x," and the corrected data of the sensor 420A is represented by "y," the correction model may be represented by an Equation 1 as below:

$$y = a1*x + b1 \qquad \text{Equation 1}$$

It is to be understood that the above Equation 1 is just a simple example for indicating an association relationship between the raw data monitored by the low precision sensor and corrected data. In other situation, the association relationship may be represented by more complicated equation(s) comprising more or less parameters. In the above Equation 1, values of the parameters "a1" and "b1" may be obtained from human experience or other historical data. For example, a machine learning method may be implemented for obtaining Equation 1.

Figure 4B:
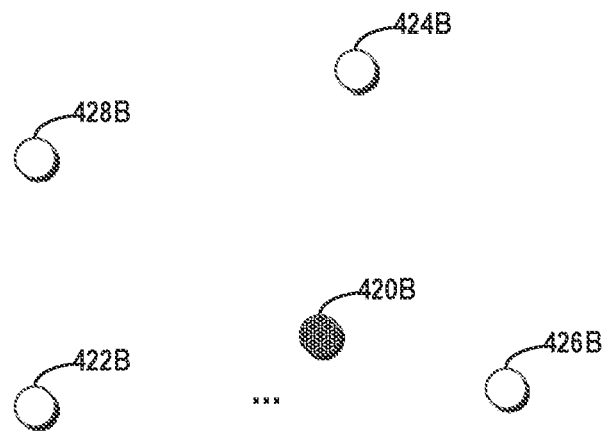
FIG. 4B depicts an example diagram of a distribution of corrected data for the plurality of sensors.

Usually, the correction model may be used for correcting raw data monitored by multiple sensors located in an area near the high precision sensor. However, sometimes the corrected data may show diversities and corrected data for some sensors may deviate from those for other sensors. FIG. 4B depicts an example diagram of a distribution of corrected data for the plurality of sensors 420A, 422A, 424A, 426A and 428A in FIG. 4A.

All of the raw data monitored by the sensors 420A, 422A, 424A, 426A and 428A may be corrected by the above Equation 1. In FIG. 4B, reference numbers 420B, 422B, 424B, 426B and 428B indicate corrected data for the sensors 420A, 422A, 424A, 426A and 428A. Although the above sensors are located in the same region and all the raw data are processed by the same correction model, the corrected data may include outlier(s). For example, the data 420B may deviate from the other data 422A, 424A, 426A and 428A according to various situations: (1) the ambient situation at the sensor 420A is different from nearby locations (for example, the sensor 420A is near a factory); (2) a hardware failure occurs in the sensor 420A; and (3) the correction model is not appropriate for the sensor 420A. The above situations (1) and (2) are easy to be detected and corrected, while the situation (3) relates to building a new correction model. At this point, how to correct a potential error in the present correction model and provide accurate results becomes a research focus.

In view of the above, the present invention provides an effective solution for error correction based on historical data. In the present invention, the raw data indicates data that is directly monitored by the sensor, and the data obtained from the sensor indicates the data that is obtained by correcting the raw data with the correction model. Hereinafter, reference will be made to FIG. 5 for a general description of embodiments of the present invention.

Figure 5:
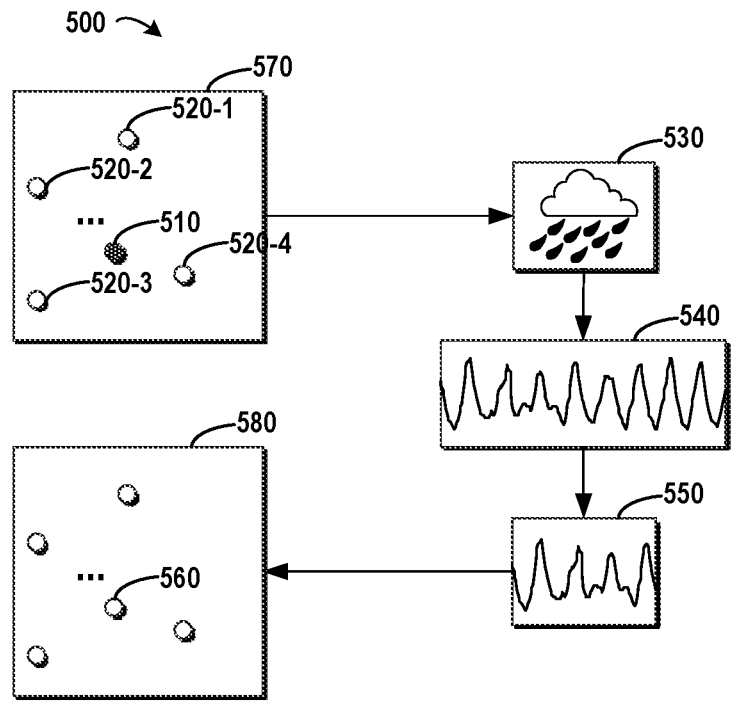
FIG. 5 depicts an example diagram for correcting an error in data obtained from a sensor according to an embodiment of the present invention.

FIG. 5 depicts an example diagram 500 for correcting an error in data obtained from a sensor according to an embodiment of the present invention. In FIG. 5, a data distribution 570 shows a distribution of data obtained from a plurality of sensors. In the data distribution 570, a first data 510 deviates from second data 520-1, 520-2, 520-3, and 520-4 (collectively referred to as second data 520). Here, the first data 510 is determined from first raw data monitored by the sensor 420A and a first correction model, and the second data 520 is determined from second raw data monitored by the sensors 422A, 424A, 426A and 428A and the first correction model. Although the same correction model is applied to all the sensors, the first data 510 deviates from the second data 520 to a certain extent (for example, 20% or another threshold). At this point, it may be considered that the first correction model is not suitable for the first data 510, and the first data 510 may be corrected according to embodiments of the present invention.

The ambient situation may reflect raw data, which in turn may reflect the obtained data. For example, the data obtained in a windy day may be different from that obtained in a rainy day. Accordingly, an ambient situation 530 where the first data 510 and the second data 520 is obtained may be identified. Further, historical raw data 540 monitored by the plurality of sensors around the sensor 410 under a similar ambient situation may be selected for correcting the first data 510. In FIG. 5, a group 550 of raw data that is monitored under the ambient situation may be selected from historical raw data 540. Supposing the first data 510 and the second data 520 is obtained in a windy day, the raw data that is monitored in a windy day may be selected as the group 550 of raw data. Further, the group 550 of raw data and data that is determined from the selected group of raw data may be used to generate a second correction model for correcting the first data 510 to data 560.

With these embodiments, when the current first correction model cannot work well for the first data 510, the first data 510 may be corrected based on the above procedure as described in FIG. 5. As the historical raw data 540 and the data determined from the raw data may reflect the particular ambient situation and may be considered as reliable, then a new correction model may be built on the reliable basis for correcting a potential error in the first data 510.

Figure 6:
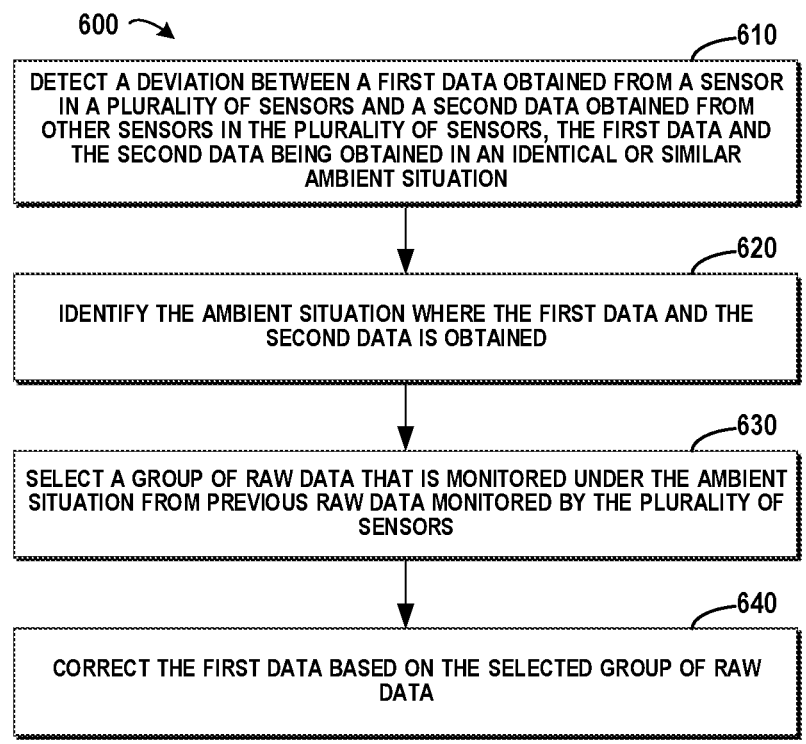
FIG. 6 depicts an example flowchart of a method for correcting an error in data obtained from a sensor according to an embodiment of the present invention.

Reference will be made to FIG. 6 for more details about embodiments of the present invention. FIG. 6 depicts an example flowchart of a method 600 for correcting an error in data obtained from a sensor according to an embodiment of the present invention. At block 610, a deviation may be detected between the first data 510 obtained from the sensor 420A and the second data 520 obtained from the sensors 422A, 424A, 426A and 428A. If the deviation is detected, then the method 600 may proceed to block 620. Here, the first data 510 and the second data 520 may be obtained in an identical or similar ambient situation.

At block 620, the ambient situation 530 where first data 510 and second data 520 is obtained may be identified. The ambient attribute 530 may comprise various aspects of the environment where the sensors are deployed. In some embodiments of the present invention, the ambient attribute 530 may comprise any of: a wind direction, a wind level, a temperature, an air pressure, a humidity level, a weather condition, and a geography condition.

Here, the wind direction may indicate a direction of the wind in the windy day. The wind direction may be represented by multiple formats such as east wind or west wind. Alternatively, the wind direction may be represented by an angle such as an angle between the wind direction and the north direction. The wind level may be represented according to a definition of the World Meteorological Organization, or the wind level may also be represented by a wind speed. Similarly, the formats of the temperature, the air pressure, the humidity level, the weather condition and the geography condition may be defined in various ways.

At block 630, a group 550 of raw data that is monitored under the ambient situation 530 may be selected from the historical raw data 540 monitored by the plurality of sensors.

The historical raw data 540 may be stored in various formats, and an example format is presented in Table 1 for description.

TABLE 1

Example Historical Raw Data

|  | Day 1 | Day 2 | ... | Day N |
|---|---|---|---|---|
| Ambient Situation | Windy | Rainy | ... | Rainy |
| Raw Data | RawValue1 | RawValue2 | ... | RawValueN |

Table 1 shows the historical raw data monitored by a sensor, where the first row indicates the day when the raw data is monitored by the sensor, the second row indicates the ambient situation when the raw data is monitored, and the third row indicates values of the raw data. It is to be understood that the above Table only illustrate an example data structure for storing the raw data. In another example, the raw data may include more information such as a date and time point when the raw data is monitored.

If the ambient situation 530 indicates that the first data 510 and the second data 520 is obtained in a rainy day, then the raw data monitored in Day 2 and Day N may be selected as the group 550 of raw data. If the ambient situation 530 indicates that the first data 510 and the second data 520 is obtained in a windy day, then the raw data monitored in Day 1 and other windy days may be selected as the group 550 of raw data.

In some embodiments of the present invention, the ambient situation in Table 1 may be represented in a finer granularity by replacing the "ambient situation" with the above ambient attributes. At this point, the raw data may be stored in an example format of Table 2.

TABLE 2

Example Historical Raw Data

|  | Day 1 | Day 2 | ... | Day N |
|---|---|---|---|---|
| Wind Direction | East | West | ... | West |
| Wind Level | 1 | 2 | ... | 3 |
| Temperature | 30 | 31 | ... | 30 |
| Air Pressure | 1 | 0.99 | ... | 0.95 |
| Humidity Level | 50% | 50% | ... | 60% |
| Weather Condition | Windy | Rainy | ... | Rainy |
| Geography Condition | Mountain | Plain | ... | Plain |
| Raw Data | RawValue1 | RawValue2 | ... | RawValueN |
| Data | Value1 | Value2 | ... | ValueN |

Usually, one or more attributes of the ambient situation 530 may have a stronger impact on the raw data and in turn affects the first data 510 more than another attribute in the group of ambient attributes. Therefore, the one or more attributes may be identified from a group of ambient attributes of the ambient situation 530.

Further, the group 550 of raw data may be selected based on the identified ambient attribute 530, specifically, the selected group of raw data that is monitored in a time duration having the ambient attribute may be selected. Usually, in a rainy day, the air quality at various locations may be similar and thus the weather condition may be identified and raw data that is monitored in the rainy days may be selected as the group 550 of raw data. In a windy day, the wind direction may affect the air quality and thus raw data that is monitored in days with similar wind direction may be selected as the group 550 of raw data. In a windless day, the humidity level may affect the air quality and thus raw data that is monitored in days with similar humidity may be selected as the group 550 of raw data. In some embodiments of the present invention, the above ambient attributes may be assigned with respective weights to provide a method for selecting the group 550 of raw data based on a whole picture of all the ambient attributes.

At block 640, the first data 510 may be corrected based on the selected group 550 of raw data. In these embodiments, the first data 510 is obtained based on first raw data monitored by the sensor 420A and a first correction (such as Equation 1), and the second data 520 is obtained based on second raw data monitored by the other sensors 422A, 424A, 426A and 428A and the first correction. Here, the corrected data may be determined based on the selected group 550 of raw data and the first correction model. In some embodiments of the present invention, the corrected data may be stored together with the raw data as below.

TABLE 3

Example Historical Raw Data and Corrected Data

|  | Day 1 | Day 2 | ... | Day N |
|---|---|---|---|---|
| Ambient Situation | Windy | Rainy | ... | Rainy |
| Raw Data | RawValue1 | RawValue2 | ... | RawValueN |
| Corrected Data | Value1 | Value2 | ... | ValueN |

Figure 7:
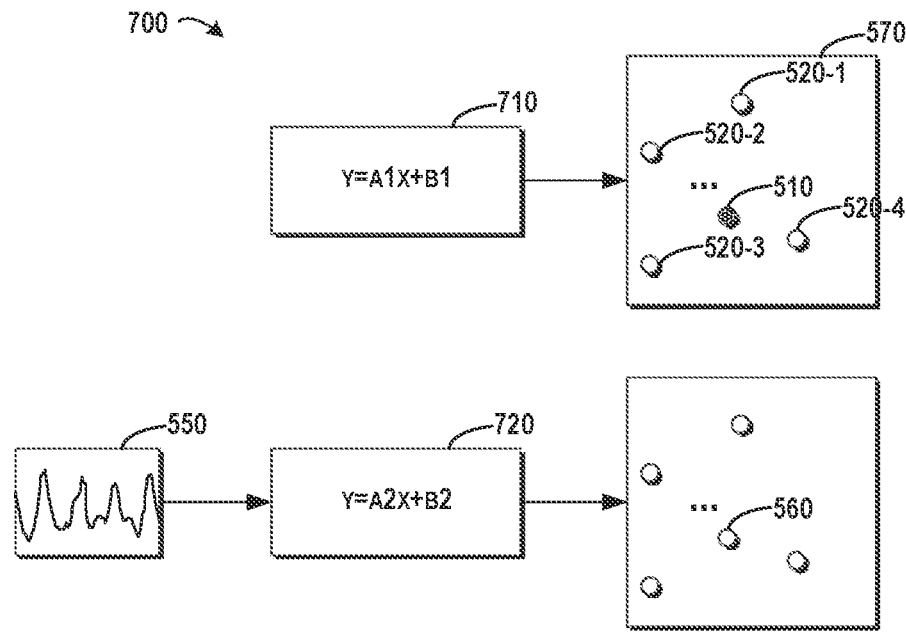
FIG. 7 depicts an example diagram for training a correction model based on historical raw data according to an embodiment of the present invention.

The first three rows are similar as those in Table 1, and the fourth row indicates values of data that is corrected by the first correction model. Accordingly, data in the rows "Raw Data" and "Corrected Data" may be used to determine a second correction, and then the first data 510 may be corrected by the second correction model based on the first raw data. Reference will be made to FIG. 7 for description.

FIG. 7 depicts an example diagram 700 for training a correction model based on historical raw data and corrected data according to an embodiment of the present invention. The upper part of FIG. 7 illustrates a first correction model 710 which corrects the first raw data into the first data 510. The lower part of FIG. 7 illustrates a procedure for generating a second correction model 720 for correcting a potential error in the first data 510. Supposing the second correction model 720 may be represented by the equation as below:

$$y = a2 * x + b2 \qquad \text{Equation 2}$$

In some embodiments of the present invention, the second correction 720 may be trained based on the selected group 550 of raw data, such that the trained second correction represents an association relationship between the group of raw data and the corrected under the ambient situation. Accordingly, the procedure for generating the second correction model 720 relates to how to determine the values of the parameters a2 and b2. Here, the group 550 of raw data and corrected data may be involved in the Equation 2. Specifically, the variable "x" represents the raw data and the variable "y" indicated the data corrected by the first correction model. Continuing the above historical raw data in Table 1, if the raw data of Day 2 and Day N are selected, then Equation 3 may be generated by replacing the variable "x" and "y" with "RawValue2" and "Value2" in the Equation 2, and Equation 4 may be generated by replacing the variable "x" and "y" with "RawValueN" and "ValueN" in the Equation 2.

$$\text{Value2} = a2 * \text{RawValue2} + b2 \quad \text{Equation 3}$$

$$\text{Value}N = a2 * \text{RawValue}N + b2 \quad \text{Equation 4}$$

As "Value2," "RawValue2," "ValueN," and "RawValueN" are known from Table 3, the values of "a2" and "b2" may be determined by solving Equations 3 and 4. Accordingly, the second correction model 720 may be generated. In some embodiments of the present invention, if the group 550 of raw data relates to more than two days, then the values of "a2" and "b2" may be determined based on an average of the solved values of "a2" and "b2." Further, the first data 510 may be corrected with the second correction model 720. As the group 550 of raw data and the corrected data in Table 3 is considered as reliable data, the second correction model 720 which is generated based on a reliable ground may reflect an accurate association relationship between the raw data and the corrected data. Therefore, the first data 510 which deviates from the second data 520 may be corrected in a reliable manner.

Figure 8:
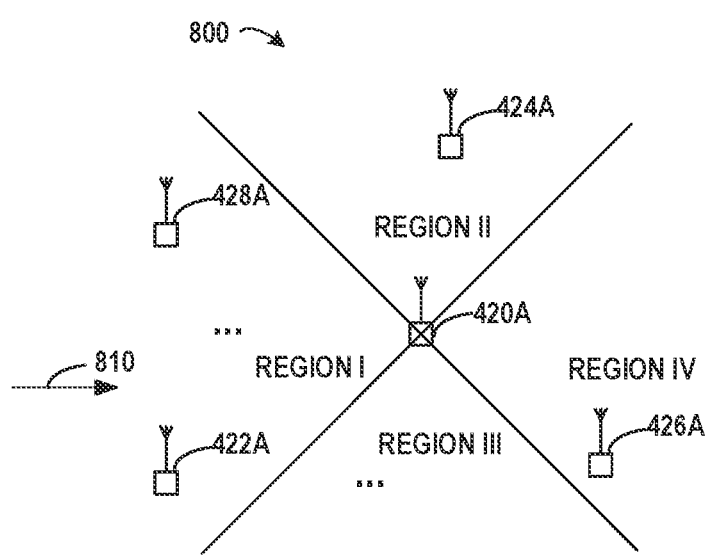
FIG. 8 depicts an example diagram for dividing an area occupied by a plurality of sensors into regions according to an embodiment of the present invention.

In some embodiments of the present invention, locations of the sensors 422A, 424A, 426A and 428A may be considered in selecting the group 550 of raw data. Specifically, an area occupied by the plurality of sensors may be divided into a plurality of regions according to the ambient situation and a spatial relationship between the sensor 510 and the other sensors 422A, 424A, 426A and 428A. Reference will be made to FIG. 8 for describing how to divide the area into multiple regions.

FIG. 8 depicts an example diagram 800 for dividing an area occupied by a plurality of sensors into a plurality of regions according to an embodiment of the present invention. If the first data 510 is obtained in a windy day, the wind direction 810 may be considered as an important attribute playing a strong impact on the raw data. As shown in FIG. 8, the wind direction 810 is from the west to east and thus the area may be divided into Regions I, II, III, and IV. In some embodiments of the present invention, the boundary between regions may go through a location of the sensor 420A.

Although the area is divided into four regions in FIG. 8, more or less regions may be obtained in other embodiments. For example, if the wind direction 810 is from the northeast to southwest, then the area may be divided into for example 8 regions. For another example, if the wind direction is represented by an angle of 15 between the north and the wind direction, then the area may be divided into for example 12 regions, each of the regions has an angle of 360°/12=30°.

In some embodiments of the present invention, a region may be selected from the plurality of regions based on the ambient situation, and raw data monitored by the sensor is affected by the selected region more than a further region in the plurality of regions. In some embodiments of the present invention, the ambient situation comprises a wind direction, and a region that locates in an upstream direction of the wind direction may be selected. Referring to FIG. 8, Region I locates in the upstream direction of the wind direction 810 may be selected. Accordingly, the group of raw data that is monitored by sensors in Region I under the ambient situation 530 may be selected.

Continuing the above example of Table, the wind directions in Day 2 and Day N are west, and thus the raw data in Day 2 and Day N may be selected. Further, the selected raw data may also be filtered based on the Region I, and only raw data monitored by sensors in Region I may be selected, while raw data monitored by sensors in other regions may be filtered out duo to its small impacts on the first data 510. With these embodiments, both of the ambient situation and the spatial relationships between the sensors are considered in building the second correction model, such that the second correction model may be built on raw data and data with a closer relationship.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, via a first machine learning model, a first and second data based on a respective first raw data obtained from a first sensor and second raw data obtained from a second sensor, wherein the first machine learning model comprises a correction model used to correct the first and second raw data to generate the first and second data, respectively;
determining, based on a deviation between the first data and the second data, an inaccuracy of the first data indicating an inadequacy of the first machine learning model to correct the first raw data;
identifying an ambient situation corresponding to the first raw data and the second raw data;
selecting, from historical raw data of the first and second sensors, a group of raw data corresponding to the ambient situation; and
correcting, via a second machine learning model and after determining the inaccuracy of the first data, the first data based on the selected group of raw data.

2. The method of claim 1, further comprising:
identifying, by one or more processors, a first ambient attribute of the ambient situation, wherein the first ambient attribute affects the first data more than a second ambient attribute of the ambient situation,
wherein selecting the group of raw data comprises: selecting, by the one or more processors, the group of raw data based on the first ambient attribute.

3. The method of claim 2, wherein the correcting the first data comprises:
determining, by the one or more processors, a third data based on the selected group of raw data and the first machine learning model;
determining, by the one or more processors, correction data based on the second machine learning model, the selected group of raw data, and the third data; and
correcting, by the one or more processors, the first data based on the first raw data and the correction data.

4. The method of claim 3,
wherein the second machine learning model is trained based on the selected group of raw data and the third data, such that the correction data indicates an associative relationship between the selected group of raw data and the third data for the ambient situation.

5. The method of claim 2, wherein the first ambient attribute comprises any of: a wind direction, a wind level, a temperature, an air pressure, a humidity level, a weather condition, and a geography condition.

6. The method of claim 1, further comprising:
dividing, by one or more processors, an area occupied by the first sensor and a plurality of sensors into a plurality of regions based on the ambient situation and a spatial relationship between the first sensor and the plurality of sensors, wherein the first raw data is obtained only from the first sensor and the second raw data is obtained from the plurality of sensors, which includes the second sensor, and wherein the group of raw data is selected based on the plurality of regions.

7. The method of claim 6, wherein selecting the group of raw data based on plurality of regions comprises:
selecting, by one or more processors, a region of the plurality of regions based on the ambient situation and an effect of the region on the first data, wherein the first data is affected by the selected region more than a further region of the plurality of regions, and wherein the group of raw data includes data from a sensor in the selected region.

8. The method of claim 7, wherein the ambient situation comprises a wind direction, and the selected region is located in an upstream direction of the wind direction.

9. A computer-implemented system, comprising a computer processor coupled to a computer-readable memory unit, the memory unit comprising instructions that when executed by the computer processor implements a method comprising:
generating, via a first machine learning model, a first and second data based on a respective first raw data obtained from a first sensor and second raw data obtained from a second sensor, wherein the first machine learning model comprises a correction model used to correct the first and second raw data to generate the first and second data, respectively;
determining, based on a deviation between the first data and the second data, an inaccuracy of the first data indicating an inadequacy of the first machine learning model to correct the first raw data;
identifying an ambient situation corresponding to the first raw data and the second raw data;
selecting, from historical raw data of the first and second sensors, a group of raw data corresponding to the ambient situation; and
correcting, via a second machine learning model and after determining the inaccuracy of the first data, the first data based on the selected group of raw data.

10. The system of claim 9, wherein the method further comprises:
identifying a first ambient attribute of the ambient situation, wherein the first ambient attribute affects the first data more than a second ambient attribute of the ambient situation,
wherein selecting the group of raw data comprises: selecting the group of raw data based on the first ambient attribute.

11. The system of claim 10, wherein the correcting the first data comprises:
determining a third data based on the selected group of raw data and the first machine learning model;
determining correction data based on the second machine learning model, the selected group of raw data, and the third data; and
correcting the first data based on the first raw data and the correction data.

12. The system of claim 11, wherein the second machine learning model is trained based on the selected group of raw data and the third data, such that the correction data indicates an associative relationship between the selected group of raw data and the third data for the ambient situation.

13. The system of claim 10, wherein the first ambient attribute comprises any of: a wind direction, a wind level, a temperature, an air pressure, a humidity level, a weather condition, and a geography condition.

14. The system of claim 9, wherein the method further comprises:
dividing an area occupied by the first sensor and a plurality of sensors into a plurality of regions based on the ambient situation and a spatial relationship between the first sensor and the plurality of sensors, wherein the first raw data is obtained only from the first sensor and the second raw data is obtained from the plurality of sensors, which includes the second sensor, and wherein the group of raw data is selected based on the plurality of regions.

15. The system of claim 14, wherein selecting the group of raw data based on plurality of regions comprises:
selecting a region of the plurality of regions based on the ambient situation and an effect of the region on the first data, wherein the first data is affected by the selected region more than a further region of the plurality of regions, and wherein the group of raw data includes data from a sensor in the selected region.

16. The system of claim 15, wherein the ambient situation comprises a wind direction, and the selected region is located in an upstream direction of the wind direction.

17. A computer program product, the computer program product comprising a computer readable storage medium having program instructions embodied therewith, the program instructions executable by an electronic device to cause the electronic device to perform actions of:
generating, via a first machine learning model, a first and second data based on a respective first raw data obtained from a first sensor and second raw data obtained from a second sensor, wherein the first machine learning model comprises a correction model used to correct the first and second raw data to generate the first and second data, respectively;
determining, based on a deviation between the first data and the second data, an inaccuracy of the first data indicating an inadequacy of the first machine learning model to correct the first raw data;
identifying an ambient situation corresponding to the first raw data and the second raw data;
selecting, from historical raw data of the first and second sensors, a group of raw data corresponding to the ambient situation; and
correcting, via a second machine learning model and after determining the inaccuracy of the first data, the first data based on the selected group of raw data.

18. The computer program product of claim 17, wherein the actions further comprise:
identifying a first ambient attribute of the ambient situation, wherein the first ambient attribute affects the first data more than a second ambient attribute of the ambient situation,
wherein selecting the group of raw data comprises: selecting the group of raw data based on the first ambient attribute.

19. The computer program product of claim 18, wherein the correcting the first data comprises:
determining a third data based on the selected group of raw data and the first machine learning model;
determining correction data based on the second machine learning model, the selected group of raw data, and the third data; and correcting the first data based on the first raw data and the correction data.

20. The computer program product of claim 17, wherein the actions further comprise:

dividing an area occupied by the first sensor and a plurality of sensors into a plurality of regions based on the ambient situation and a spatial relationship between the first sensor and the plurality of sensors, wherein the first raw data is obtained only from the first sensor and the second raw data is obtained from the plurality of sensors, which includes the second sensor, and wherein the group of raw data is selected based on the plurality of regions.

\* \* \* \* \*